(No Model.)
W. R. EVANS.
FILTER.
No. 487,614. Patented Dec. 6, 1892.
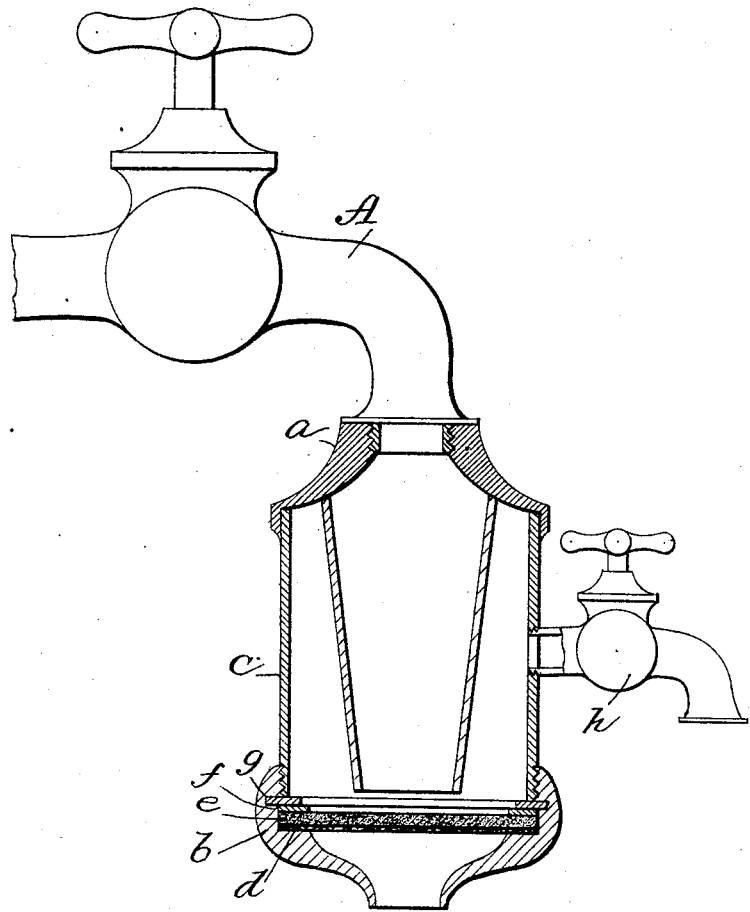
Attest
Wallen Donaldson
F. L. Middleton
Inventor
Warren R. Evans
by Ellis Spear
Atty.

UNITED STATES PATENT OFFICE.

WARREN R. EVANS, OF PORTLAND, MAINE.

FILTER.

SPECIFICATION forming part of Letters Patent No. 487,614, dated December 6, 1892.

Application filed February 9, 1892. Serial No. 420,841. (No model.)

*To all whom it may concern:*

Be it known that I, WARREN R. EVANS, a citizen of the United States of America, residing at Portland, in the county of Cumberland and State of Maine, have invented certain new and useful Improvements in Filters, of which the following is a specification.

My invention is an improvement in filters of the class known as "faucet-filters" and adapted to be attached to the open end of the faucet by means of a screw-thread or other form of attachment.

My invention consists in the simple form of the filter, in the specific construction by means of which the filter may be taken apart and thoroughly cleansed, and, further, in the use of a faucet or vent in connection with the filter, by means of which the filter may be automatically cleaned by the action of the water.

In the drawing the figure represents the filter as attached to a faucet and is shown in section.

A representative form of faucet is shown at A, and to this the filter is shown as attached by screw-threads, though it will be understood that any form of attachment may be used instead. The filter has two heads $a$ $b$, and these heads are connected by a cylindrical body portion $c$. The head $b$ is screwed to the body portion and carries the filtering material, which may be composed of any suitable substance, being preferably supported upon a layer of gauze made of wire, (indicated at $d$.) The filtering material is indicated at $e$. A washer $f$ encircles the edge or upper periphery of the filtering material, which may be suitably confined, and above this washer is a gasket $g$, and the connection of the parts places a pressure upon this gasket and prevents leakage. From the upper head a tubular extension projects, made slightly tapering and extending near the bottom of the filter, and this directs the water to the center of the filter directly in line with the exit-opening, so that the flow is direct.

It will be seen that the filter can be readily cleaned and replaced.

In order to clean the filter automatically, I have provided a faucet $h$ in the side of the filter, and by turning this faucet and allowing the full force of the water to flow through the filter a part of the flow will be under the lower edge of the conical directing-tube, which will tend to thoroughly cleanse all the sediment which may have collected and carry it up and out through the faucet $h$. This washing action of the water is aided largely by the conical shape of the central tube, which tends to confine the water at its lower end, thus increasing its force as it flows under the edge of the tube.

I claim as my invention—

In combination, the body portion, the upper and lower heads removably secured thereto, the said lower head carrying the filtering material and the upper head having secured thereto to be removed therewith a central conical directing-tube extending down within the body of the filter, with a space between its lower end and the filtering material, and the space within the said body and about the central tube being free, and the faucet $h$, opening through the body portion to the free space, substantially as described.

In testimony whereof I affix my signature in presence of two witnesses.

WARREN R. EVANS.

Witnesses:
JOSIAH H. DRUMMOND, Jr.,
JOHN B. KEHOE.